(12) United States Patent
Hung et al.

(10) Patent No.: US 6,404,268 B1
(45) Date of Patent: Jun. 11, 2002

(54) CIRCUIT FOR SIMULATING ZERO CUT-IN VOLTAGE DIODE AND RECTIFIER HAVING ZERO CUT-IN VOLTAGE CHARACTERISTIC

(75) Inventors: Hsi-Hsien Hung, Taipei; Hsin Chou Lee, Nantou Hsien, both of (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 09/739,704

(22) Filed: Dec. 20, 2000

(51) Int. Cl.[7] ................................................ H02M 7/00
(52) U.S. Cl. ........................ 327/531; 324/494; 363/127
(58) Field of Search ................................ 327/423, 424, 327/530, 494, 531; 363/126, 127

(56) References Cited

U.S. PATENT DOCUMENTS

| | | | | |
|---|---|---|---|---|
| 3,819,951 A | * | 6/1974 | Moore | 363/127 |
| 4,139,880 A | * | 2/1979 | Ullmer et al. | 363/127 |
| 4,485,348 A | * | 11/1984 | Perkins | 363/127 |
| 5,622,886 A | * | 4/1997 | Allum et al. | 438/238 |
| 5,781,043 A | * | 7/1998 | Slemmer | 327/541 |
| 5,870,031 A | * | 2/1999 | Kaiser et al. | 363/127 |
| 6,052,299 A | * | 4/2000 | Schieke | 438/127 |
| 6,078,512 A | * | 6/2000 | Bouvier | 363/127 |

* cited by examiner

*Primary Examiner*—Terry D. Cunningham
(74) *Attorney, Agent, or Firm*—Bacon & Thomas

(57) ABSTRACT

There is disclosed a circuit for simulating zero cut-in voltage diode and a rectifier having zero cut-in voltage characteristic. The MOS transistors manufactured by the CMOS process are used as circuit components and are properly biased so as to provide the rectifying capability, and thus are used as a rectifying diode. Furthermore, with a proper bias, the rectifying diode has zero cut-in voltage and a low current loss, and thus a high efficient rectifier can be implement.

6 Claims, 6 Drawing Sheets

CIRCUIT FOR SIMULATING ZERO CUT-IN VOLTAGE DIODE AND RECTIFIER HAVING ZERO CUT-IN VOLTAGE CHARACTERISTIC

BACKGROUND OF THE INVENTION

1. Field of the Invention

The present invention relates to a diode circuit and rectifier and, more particularly, to a MOS transistor circuit manufactured by the CMOS process for simulating a zero cut-in voltage diode and a zero cut-in voltage rectifier including the diode.

2. Description of Related Art

The conventional AC to DC full wave rectifier is generally formed by diodes. Since the diode has a cut-in voltage of 0.6V, the rectifier will have a power loss in voltage conversion. Particularly, when the input voltage is small, the negative influence caused by such a power loss becomes obvious and unacceptable.

In the field of contactless ICs and the like, the power supply of the IC is a low power AC power supply in which the power is generated by the induction of a coil, and thus, the efficiency by which the power supply output is rectified will directly affect the use range of the IC. As a result, the operating efficiency of such an IC is determined by the performance of the rectifier.

In the aforementioned AC to DC full wave rectifier, a popular circuit known as a full wave bridge rectifier, illustrated in FIG. 6, has four diodes 902 to 905 connected in a bridge structure. With such a circuit, when the AC power source 901 applies an AC signal to the full wave rectifier, the diodes 902 and 905 are turned on if the applied waveform ACIN1>ACIN2. The AC signal then charges the capacitor 906 through the diodes 902 and 905. However, if ACIN2>ACIN1, the diodes 903 and 904 are turned on, and the AC signal charges the capacitor 906 through the diodes 903 and 904. As such, the AC power can be rectified to produce a DC power.

FIG. 7 is the rectifying waveform of a bridge rectifier, which shows that, due to the influence of the cut-in voltage of the diode, the rectified DC voltage VDD only has a maximum value of Vac−2*Vd, where Vac is the voltage peak value of the AC power source 901 and Vd is the cut-in voltage of the diode. Therefore, the rectifying performance of the rectifier is greatly degraded.

In order to solve such a problem, FIG. 8 shows another conventional rectifier circuit, which uses metal oxide semiconductor (MOS) transistors 914 and 915 with N-type substrate to control the diodes for performing the rectifying operation of AC to DC conversion. When ACIN1−ACIN2>Vtn (Vtn is the threshold voltage of N-type MOS transistor), the N-type MOS transistor 915 is turned on, and the ACIN2 is applied to a lowest voltage VSS. When ACIN1−VDD>Vd, the diode 912 is turned on, and the AC power source starts to charge VDD. When ACIN2−ACIN1>Vtn, the N-type MOS transistor 914 is turned on, ACIN1 is applied to a lowest voltage VSS. When ACIN2−VDD>Vd, the diode 913 is turned on, and the AC voltage source starts to charge the VDD.

FIG. 9 is a rectifying waveform of the rectifier circuit shown in FIG. 8. In comparison with the waveform shown in FIG. 7, it is known that this improved rectifier circuit is able to reduce a voltage drop equal to one cut-in voltage of a diode. That is, the maximum value of the DC voltage VDD is only improved to be Vac−Vd. Under a condition of no current load, there is still a voltage loss of 0.6V. Thus, the influence of the cut-in voltage can not be completely removed.

In order to entirely remove the cut-in voltage of the diode so that the maximum value of the VDD is Vac, U.S. Pat. No. 5,825,214 granted to Klosa discloses an "Integrated circuit arrangement with diode characteristic" for replacing the conventional diodes to realize a rectifier with zero cut-in voltage. The schematic view of the circuit is illustrated in FIG. 10, which comprises three inverters 921, 922, and 923 and a P-type MOS transistor 924 for being used as a switch. The input end and output end of the inverter 921 are connected together, and thus the output voltage level is automatically set at the trigger point of the inverter. This voltage will change positively with the level of the supplying power. The voltage level set by the inverter 921 is directly applied to the input end of the inverter 922 which receives power from an AC input ACIN. The two inverters 921 and 922 have the same size and characteristic. Therefore, when the ACIN is smaller than the VDD, the input of the inverter 922 is considered to be a high voltage level. Through the inverter 923, the P-type MOS transistor 924 is turned off so as to avoid a leakage current. On the other hand, when the ACIN is larger than the VDD, the input of the inverter 922 is considered to be a low voltage level, the P-type MOS transistor 924 is turned on through the inverter 923, so as to charge VDD.

In the aforementioned circuit, the P-type MOS transistor 924 can be turned on completely to provide the advantage of zero cut-in voltage. However, if the inverters 921 and 922 are operating at a high speed, it is inevitable that a high current loss problem will be encountered. Therefore, the overall efficiency of the rectifier is unsatisfactory due to such a current loss. Consequently, it is desirable to provide an improved circuit to mitigate and/or obviate the aforementioned problems.

SUMMARY OF THE INVENTION

Accordingly, the object of the present invention is to provide a circuit for simulating a zero cut-in voltage diode and a rectifier having a zero cut-in voltage characteristic, so as to improve the efficiency of rectifying, reduce the current loss, and avoid the output voltage drop caused by the cut-in voltage of the diode.

In accordance with a first aspect of the present invention, there is provided a rectifier having zero cut-in voltage characteristic for converting AC voltage input to DC voltage output, comprising: a constant bias circuit having a resistor and a N-type MOS transistor, the N-type MOS transistor having a drain connected to the resistor and a gate connected to the drain; a first N-type MOS transistor having a gate connected to the gate of the N-type MOS transistor of the bias circuit, so as to form a zero cut-in voltage diode; a second N-type MOS transistor having a gate connected to the gate of the N-type MOS transistor of the bias circuit, so as to form another zero cut-in voltage diode; and a first P-type MOS transistor and a second P-type MOS transistor connected in a cross couple structure which are coupled to the first and second N-type MOS transistors, whereby a high voltage level of the AC voltage input is applied to a high voltage level of the DC voltage output, and a low voltage level of the AC voltage input charges a low voltage level of the DC voltage output through one of the zero cut-in voltage diodes.

In accordance with a second aspect of the present invention, there is provided a circuit for simulating zero cut-in voltage diode comprising: a first N-type MOS transistor having a gate and a drain connected together; a resistor connected to the drain of the first N-type MOS transistor for forming a bias circuit; and a second N-type MOS transistor with the same characteristic as the first N-type MOS transistor, having a gate connected to the gate of the first N-type MOS transistor; wherein the first N-type MOS transistor is controlled by the resistor to be biased almost to a threshold voltage.

In accordance with a third aspect of the present invention, there is provided a rectifier having zero cut-in voltage characteristic for converting AC voltage input to DC voltage output, comprising: a constant bias circuit having a resistor and a P-type MOS transistor, the P-type MOS transistor having a drain connected to the resistor, and a gate connected to the drain; a first P-type MOS transistor having a gate connected to the gate of the P-type MOS transistor of the bias circuit, so as to form a zero cut-in voltage diode; a second P-type MOS transistor having a gate connected to the gate of the P-type MOS transistor of the bias circuit, so as to form another zero cut-in voltage diode; and a first N-type MOS transistor and a second N-type MOS transistor connected in a cross couple structure which are coupled to the first and second P-type MOS transistors, whereby a low voltage level of the AC voltage input is applied to a low voltage level of the DC voltage output, and a high voltage level of the AC voltage input charges a high voltage level of the DC voltage output through one of the zero cut-in voltage diodes.

In accordance with a fourth aspect of the present invention, there is provided a circuit for simulating zero cut-in voltage diode comprising: a first P-type MOS transistor having a gate and a drain connected together; a resistor connected to the drain of the first P-type MOS transistor, so as to form a bias circuit; and a second P-type MOS transistor with the same characteristic as the first P-type MOS transistor, having a gate connected to the gate of the first P-type MOS transistor; wherein the first P-type MOS transistor is controlled by the resistor to be based to VDD−Vtp, where VDD represents a high voltage level of a DC voltage input and Vtp is a threshold voltage of the P-type MOS transistor.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
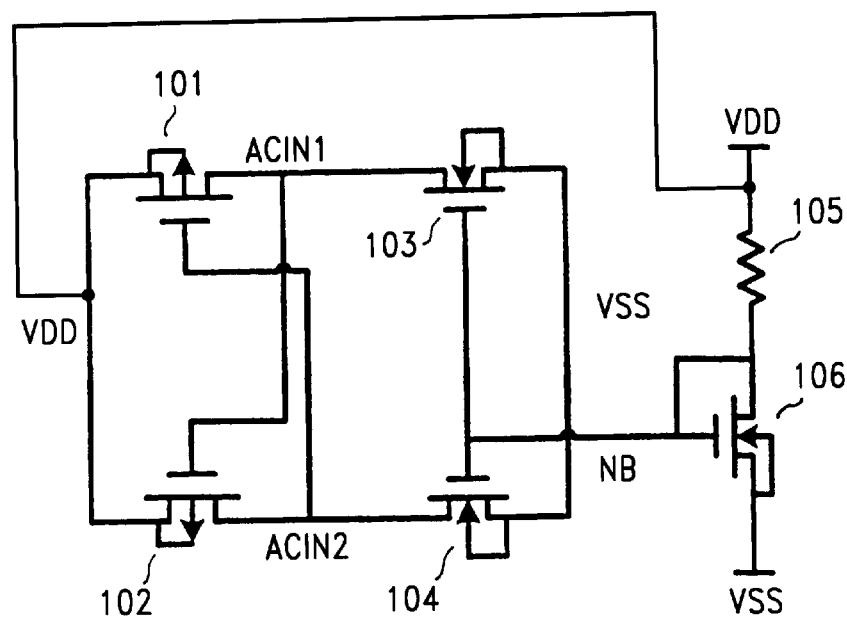
FIG. 1 is a schematic diagram of a rectifier having zero cut-in voltage characteristic in accordance with a first embodiment of the present invention.

Referring to the drawings and initially to FIG. 1, there is shown a rectifier formed by the circuit for simulating a zero cut-in voltage diode in accordance with a preferred embodiment of the present invention. As shown, ACIN1 and ACIN2 represent the inputs or terminals of an AC voltage source, and VDD and VSS represent the high voltage level and low voltage level of a DC voltage output. The transistors 101 and 102 are P-type MOS transistors connected in a cross coupled structure. Than is, the gate and drain of transistor 101 are connected to the drain and gate of the transistor 102, respectively, such that whichever of the AC voltage source inputs ACIN1 and ACIN2 that has a higher voltage level is applied through a corresponding one of the transistors 101 and 102 to VDD.

Furthermore, the N-type MOS transistor 106 is connected to a resistor 105 for forming a constant bias circuit. The N-type MOS transistor 103 is connected to the bias circuit so as to form a circuit for simulating zero cut-in voltage diode with a low current loss. Similarly, the N-type MOS transistor 104 is connected to the bias circuit so as to form another circuit for simulating zero cut-in voltage diode with a lower current loss.

Figure 2:
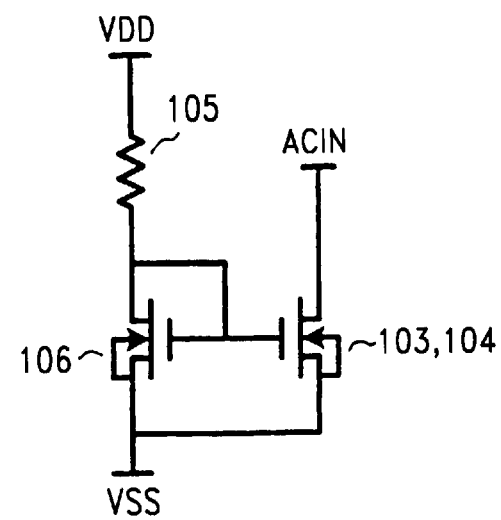
FIG. 2 is a schematic diagram of a circuit for simulating zero cut-in voltage diode in accordance with the first embodiment of the present invention.

For the purpose of convenient description, the portions of the circuit of FIG. 1 that simulate a zero cut-in voltage diode are illustrated in FIG. 2, in which ACIN is used to respectively refer to |ACIN1| or |ACIN2|, depending on whether transistor 103 or 104 is being considered. The gate and drain of the N-type MOS transistor 106 are connected together. One end of the resistor 105 is connected to the VDD, and the other end thereof is connected to the drain of the N-type MOS transistor 106 so as to form a bias circuit. Furthermore, the gate of the N-type MOS transistor 106 is connected to the gate of the N-type MOS transistor 103 or 104. The sources of the transistor 106 and the transistor 103 or 104 are all connected to VSS. Moreover, the transistor 103 or 104 and the transistor 106 all have the same operating characteristics. Therefore, by setting the resistance value of the resistor 105, the current flowing through the transistor 106 can be controlled. When the current is of several microamperes ($\mu A$), the transistor 106 is biased almost to its threshold voltage. Since the gates of the transistor 103 or 104 and the transistor 106 are connected together, and the transistor 103 or 104 and the transistor 106 have the same characteristics, the transistor 103 or 104 is also biased to the threshold voltage.

After being biased, the operation of the circuit for simulating zero cut-in voltage diode is analyzed as follows:

1. When ACIN1>VSS for transistor 103, or |ACIN2|>VSS for transistor 104, the respective transistor 103 or 104 is operating in a saturation region and current flowing from ACIN1 or ACIN2 to VSS is the aspect ratio of the transistor 103 or 104 to the transistor 106 multiplied by the bias current. This current is defined as the leakage current. The value of this current is designed to be several microamperes. As such, this operation region is deemed as a "diode" operating in a reverse bias region.

2. When ACIN1<VSS for transistor 103, or |ACIN2|<VSS for transistor 104, the source of the transistor 103 or 104 is changed from VSS to either ACIN1 or ACIN2.

Figure 3:
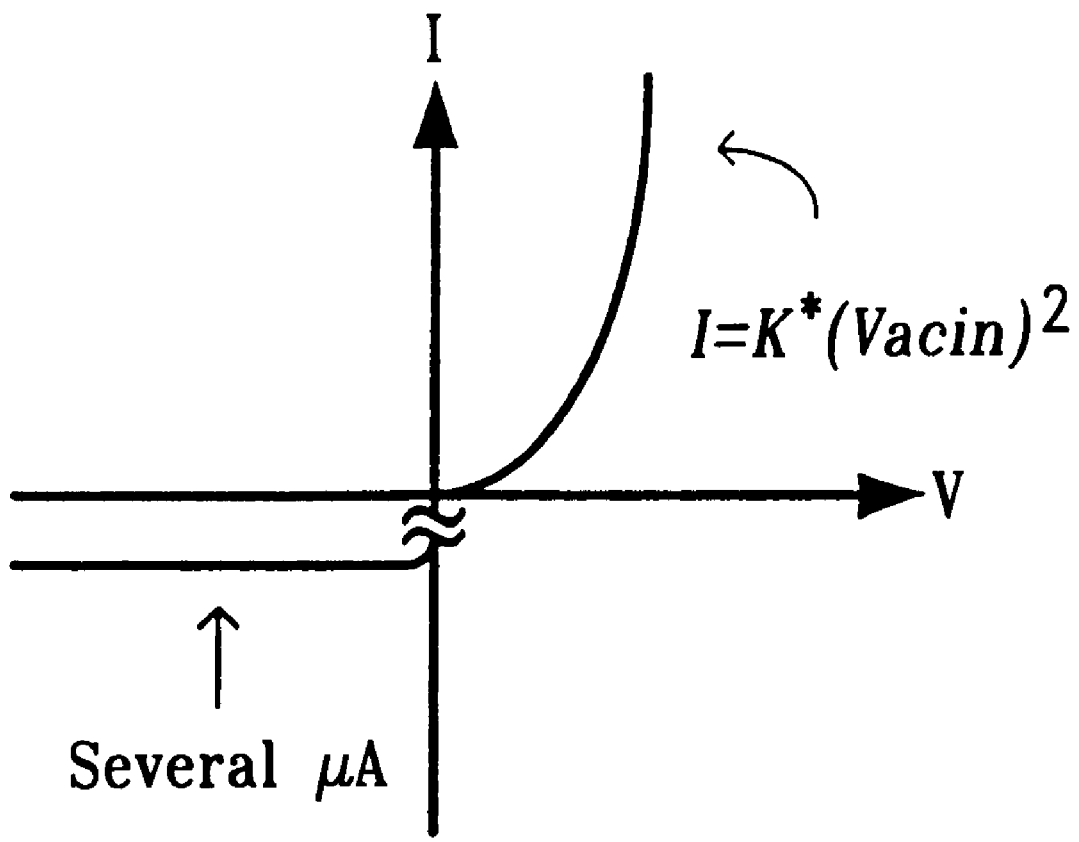
FIG. 3 shows the characteristic curve of the circuit for simulating zero cut-in voltage diode in accordance with the present invention.

The relation between the current and ACIN1 or ACIN2 is then Id=K*(V$_{ACIN}$)$^2$, where K is a constant. This operation region is deemed as the "diode" operating in a forward bias region, and its characteristic curve is shown in FIG. 3.

Referring to FIG. 1 again, when the aforementioned circuit is applied to a practical rectifier circuit, the cross coupled P-type MOS transistors 101 and 102 are coupled to the N-type MOS transistors 103 and 104 of the circuit for simulating zero cut-in voltage diode. Consequently, the operation of the rectifier is as follows:

1. When ACIN1−ACIN2>|Vtp| (Vtp is the threshold voltage of the P-type MOS transistor), the P-type MOS transistor 101 is turned on, and ACIN1 is applied to VDD. At this moment, if ACIN2 is smaller than VSS, ACIN2 starts to supply power to output VSS through the circuit for simulating a zero cut-in voltage diode formed by the transistor 104 and the bias circuit.

2. When ACIN2−ACIN1<|Vtp|, the P-type MOS transistor 102 is turned on, and ACIN2 is applied to VDD. At this moment, if ACIN1 is smaller than VSS, ACIN1 supplies power to VSS through the circuit for simulating a zero cut-in voltage diode formed by the transistor 103 and the bias circuit.

By alternately supplying the output VSS, the AC power can be converted into DC power. Furthermore, the rectifier is formed by a simulated diode circuit with zero cut-in voltage, thereby having the zero cut-in voltage characteristic. In addition, because the circuit is primarily formed by MOS transistors, the current loss is small (only several microamperes) no matter whether the rectifier is operating at high speed or low speed. Accordingly, it is able to implement a highly efficient rectifier having a low current loss.

Figure 4:
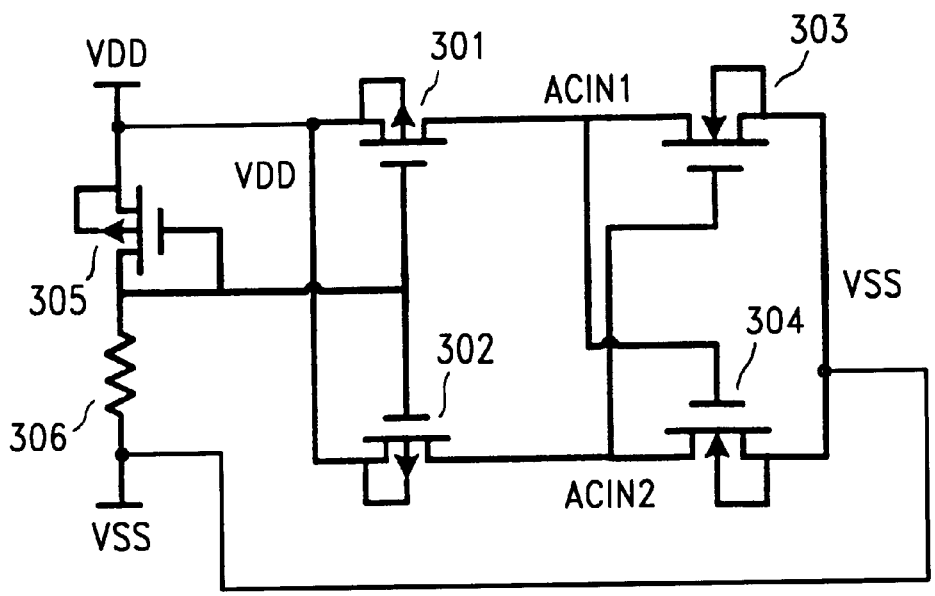
FIG. 4 is a schematic diagram of a rectifier having zero cut-in voltage characteristic in accordance with a second embodiment of the present invention.

FIG. 4 shows a rectifier having zero cut-in voltage characteristic in accordance with another preferred embodiment of the present invention. As shown, the transistors 303 and 304 are N-type MOS transistors which are connected in a cross couple structure. That is, the gate and drain of the transistor 303 are connected to the drain and gate of the transistor 304, respectively, such that one of the AC voltage source inputs ACIN1 and ACIN2 with a lower voltage level is applied to VSS.

Moreover, the P-type MOS transistor 305 is connected to a resistor 306 for forming a constant bias circuit. The P-type MOS transistor 301 is connected to the bias circuit so as to form a circuit for simulating zero cut-in voltage diode with low current loss. Similarly, the P-type MOS transistor 302 is connected to the bias circuit so as to form a circuit for simulating zero cut-in voltage diode with low current loss.

Figure 5:
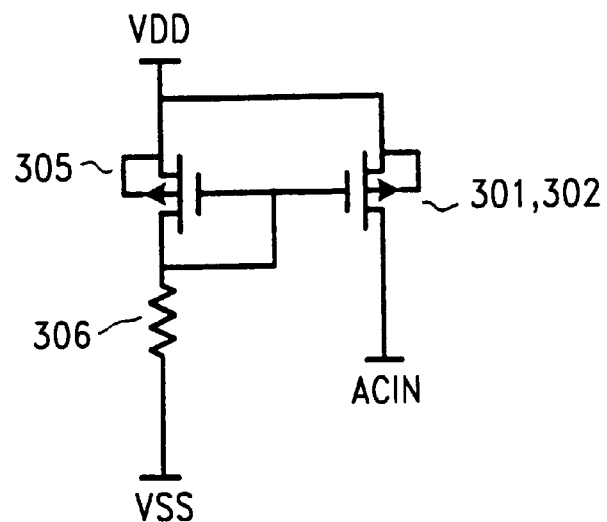
FIG. 5 is a schematic diagram of a circuit for simulating zero cut-in voltage diode in accordance with the second embodiment of the present invention.
Figure 6:
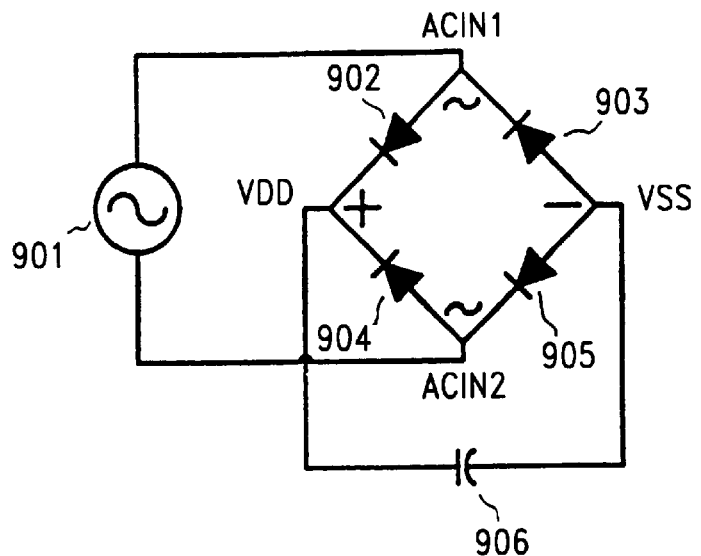
FIG. 6 is the schematic diagram of a conventional full wave rectifier.
Figure 7:
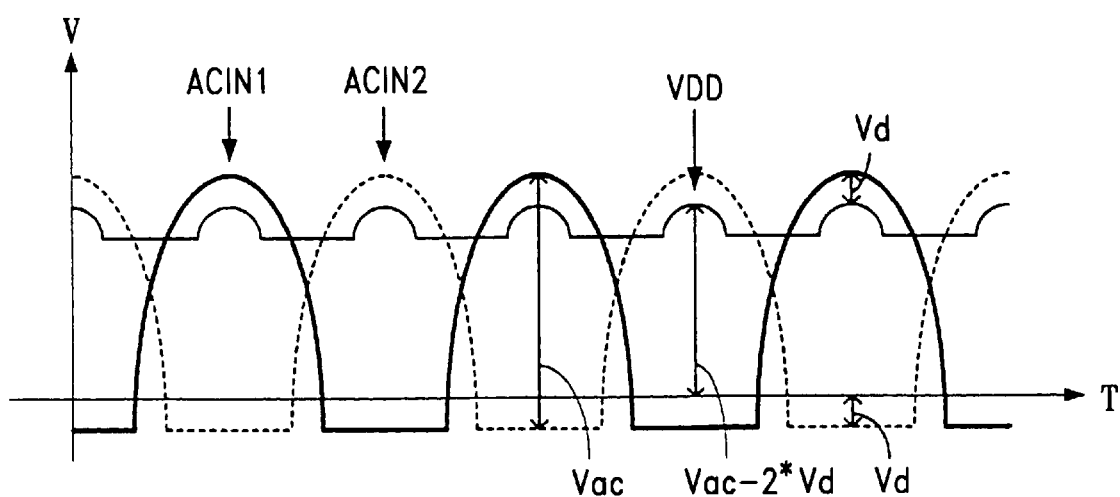
FIG. 7 shows the rectifying waveform of the full wave rectifier circuit shown in FIG. 6.
Figure 8:
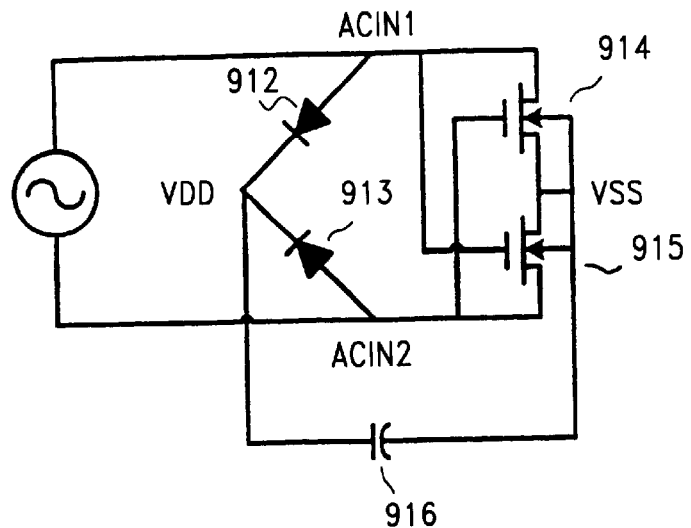
FIG. 8 is a schematic diagram of another conventional full wave rectifier.
Figure 9:
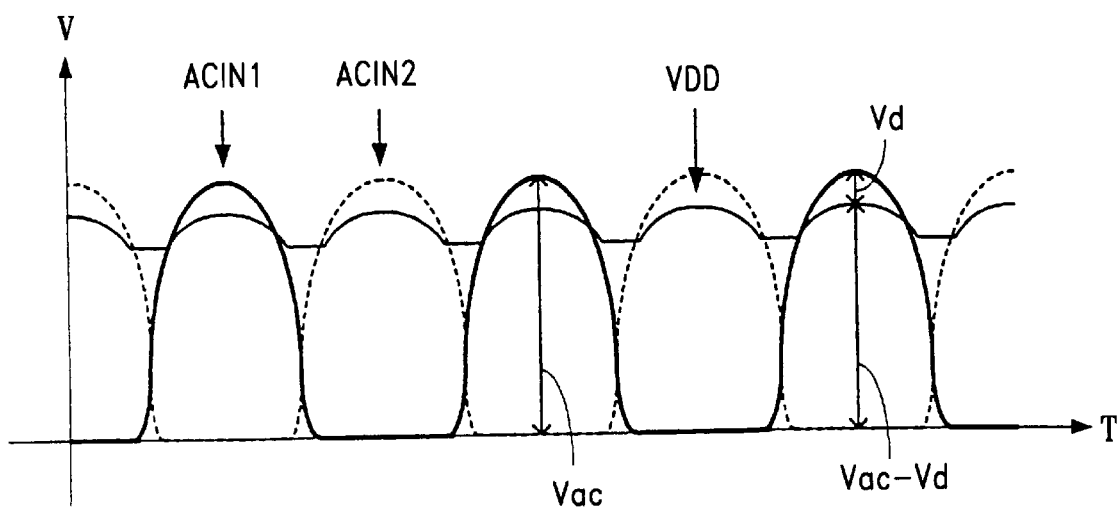
FIG. 9 shows the rectifying waveform of the full wave rectifier circuit shown in FIG. 8.
Figure 10:
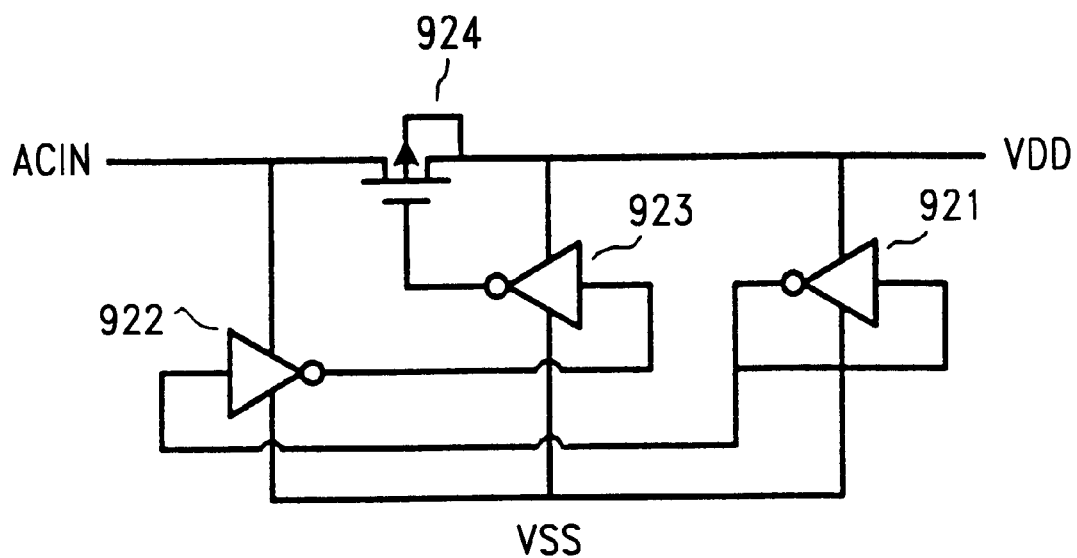
FIG. 10 is a schematic diagram of a conventional zero cut-in voltage diode.

The circuit for simulating zero cut-in voltage diode as described above is individually illustrated in FIG. 5. As shown, the gate and drain of the P-type MOS transistor 305 are connected together. One end of the resistor 306 is connected to VSS, and the other end thereof is connected to the drain of the P-type MOS transistor 305 so as to form a bias circuit. The gate of the P-type MOS transistor 305 is connected to the gate of the P-type MOS transistor 301 or 302. The sources of the transistor 305 and the transistor 301 or 302 are all connected to VDD. The transistor 301 or 302 and the transistor 305 have the same characteristic. Therefore, by setting the resistance value of the resistor 306, the transistor 305 can be biased to VDD−Vtp (Vtp is the threshold voltage of the P-type MOS transistor). Accordingly, when ACIN>VDD, the circuit is deemed as a "diode" operating in a forward bias region. When ACIN<VDD, the leakage current is only several microamperes and the circuit is deemed as a "diode" operating in a reverse bias region. The operation of this embodiment is similar to the previous one, and thus a detailed description is deemed unnecessary.

Referring to FIG. 4 again, when the aforementioned circuit is applied to a practical rectifier circuit, the cross-coupled N-type MOS transistors 303 and 304 are coupled to the P-type MOS transistors 301 and 302 of the circuit for simulating zero cut-in voltage diode. The operation of the rectifier is as follows:

1. When ACIN1−ACIN2>Vtn, the N-type MOS transistor 304 is turned on, and ACIN2 is applied to VSS. When ACIN1 is larger than VDD, ACIN1 starts to charge VDD through the P-type MOS transistor 301.

2. When ACIN2−ACIN1>Vtn, the N-type MOS transistor 303 is turned on, and ACIN1 is applied to VSS. When ACIN2 is larger than VDD, ACIN2 starts to charge VDD through the P-type MOS transistor 302.

Similarly, by alternately charging VDD, the AC power can be converted into DC power, and the rectifier can be provided with zero cut-in voltage characteristic, so as to implement a high efficient rectifier having a low current loss.

Although the present invention has been explained in relation to its preferred embodiment, it is to be understood that many other possible modifications and variations can be made without departing from the spirit and scope of the invention as hereinafter claimed.

What is claimed is:

1. A rectifier having a zero cut-in voltage characteristic for converting an AC voltage input to a DC voltage output, comprising:

a bias circuit having a resistor and an N-type MOS transistor, the N-type MOS transistor having a drain connected to the resistor and a gate connected to the drain;

a first N-type MOS transistor having a gate connected to the gate of the N-type MOS transistor of the bias circuit, a source connected to a first terminal of the AC voltage input, and a drain connected to a low voltage terminal of the DC voltage output;

a second N-type MOS transistor having a gate connected to the gate of the N-type MOS transistor of the bias circuit, a source connected to a second terminal of the AC voltage input, and a drain connected to the low voltage terminal of the DC voltage output;

a first P-type MOS transistor and a second P-type MOS transistor connected in a cross coupled structure to the first and second N-type transistors, wherein a source of the first P-type MOS transistor is connected to a source of the first N-type MOS transistor and to a gate of the second P-type MOS transistor, wherein a source of the second P-type MOS transistor is connected to a source of the second N-type MOS transistor and to a gate of the first P-type MOS transistor, and wherein respective drains of the first and second P-type MOS transistors are commonly connected to a high voltage terminal of the DC voltage output, whereby a high voltage level of the AC voltage input is applied to high voltage level of the DC voltage output through said first and second P-type MOS transistors, and a low voltage level of the AC voltage input charges a low voltage level of the DC voltage output through one of the first and second N-type MOS transistors.

2. The rectifier as claimed in claim 1, wherein the first and second N-type MOS transistors and the N-type MOS transistor of the bias circuit have the same operating characteristics.

3. The rectifier as claimed in claim 1, wherein the N-type MOS transistor of the bias circuit is controlled by the resistor to be biased almost to a threshold voltage.

4. A rectifier having a zero cut-in voltage characteristic for converting an AC voltage input to a DC voltage output, comprising:
- a bias circuit having a resistor and an P-type MOS transistor, the P-type MOS transistor having a drain connected to the resistor and a gate connected to the drain;
- a first P-type MOS transistor having a gate connected to the gate of the P-type MOS transistor of the bias circuit, a source connected to a first terminal of the AC voltage input, and a drain connected to a low voltage terminal of the DC voltage output;
- a second P-type MOS transistor having a gate connected to the gate of the P-type MOS transistor of the bias circuit, a source connected to a second terminal of the AC voltage input, and a drain connected to the low voltage terminal of the DC voltage output;
- a first N-type MOS transistor and a second N-type MOS transistor connected in a cross coupled structure to the first and second P-type transistors, wherein a source of the first N-type MOS transistor is connected to a source of the first P-type MOS transistor and to a gate of the second N-type MOS transistor, wherein a source of the second N-type MOS transistor is connected to a source of the second P-type MOS transistor and to a gate of the first N-type MOS transistor, and wherein respective drains of the first and second N-type MOS transistors are commonly connected to a high voltage terminal of the DC voltage output, whereby a high voltage level of the AC voltage input is applied to high voltage level of the DC voltage output through said first and second NP-type MOS transistors, and a low voltage level of the AC voltage input charges a low voltage level of the DC voltage output through one of the first and second P-type MOS transistors.

5. The rectifier as claimed in claim 4, wherein the first and second P-type MOS transistors and the P-type MOS transistor of the bias circuit have the same operating characteristics.

6. The rectifier as claimed in claim 4, wherein the P-type MOS transistor of the bias circuit is controlled by the resistor to be biased almost to a threshold voltage.

* * * * *